United States Patent [19]

Van Abbema

[11] Patent Number: 4,572,726
[45] Date of Patent: Feb. 25, 1986

[54] CYCLONE SEPARATOR

[75] Inventor: Art Van Abbema, Winnipeg, Canada

[73] Assignee: Vana Industries Ltd., Winnipeg, Canada

[21] Appl. No.: 516,922

[22] Filed: Jul. 25, 1983

[51] Int. Cl.⁴ ............................................. B01D 50/00
[52] U.S. Cl. ....................................... 55/337; 55/431; 55/459 R; 406/109
[58] Field of Search ............... 55/323, 324, 336, 337, 55/431, 459 R, 317; 406/39, 96, 109, 122, 171, 173, 175

[56] References Cited

U.S. PATENT DOCUMENTS

| | | | |
|---|---|---|---|
| 602,964 | 4/1898 | Van Gelder | 55/459 R |
| 2,754,970 | 7/1956 | Ross | 55/459 R |
| 3,151,961 | 10/1964 | Blackmore et al. | 55/459 R |
| 3,737,074 | 6/1973 | Davies | 406/171 |
| 4,099,937 | 7/1978 | Ufkan et al. | 55/337 X |
| 4,141,700 | 2/1979 | Norton et al. | 55/337 |
| 4,157,902 | 6/1979 | Tokar | 55/336 X |

FOREIGN PATENT DOCUMENTS

WO82/00451  2/1982  PCT Int'l Appl. .................. 406/109

*Primary Examiner*—Charles Hart
*Attorney, Agent, or Firm*—Stanley G. Ade; Adrian D. Battison

[57] ABSTRACT

A cyclone separator for use in a pneumatic grain transporter of the type including an inlet duct, fan and outlet duct where the separator extracts the particulate material from the inlet air to allow the air to pass through the fan. The cyclone separator comprises an outer cylinder and an inner cylinder coaxial therewith with the inlet communicating with the annular space therebetween. The inner cylinder includes an open bottom and a rectangular opening in the peripheral wall in the upper half thereof and extending over 90 degrees.

12 Claims, 4 Drawing Figures

CYCLONE SEPARATOR

BACKGROUND OF THE INVENTION

This invention relates to cyclone separators and particularly to the separators of the type used with grain transporting equipment.

Such apparatus generally comprises a fan for developing a first airstream upstream of the fan for collecting the particulate material and a second airstream downstream of the fan for transporting the collected particulate material along a duct to a separate location. Such apparatus are generally used for removing the material from a grain bin to place it in a truck for transport or vice versa and are particularly useful for collecting the last small amounts of the grain which cannot be transported by an auger.

In order to prevent the grain and other particulate material from passing through the fan, the grain is separated from the airstream passing into the fan by a cyclone separator. The clean air then passes from the separator through the fan and picks up the separated grain from the bottom of the separator through an airlock for transportation along the duct.

The cyclone separator generally comprises an outer container which has a cylindrical portion and an inner cylinder coaxial therewith so as to define an annular space between the two cylinders. The air and particulate material is injected into the annular space substantially tangentially thereto so that the air and particulate material swirls around the annular space with the particulate material falling to the bottom of the container and the air exiting through the bottom of the inner cylinder to an outlet at the top of the inner cylinder. However, these cyclone separators operate unsatisfactorily with some types of particulate material particularly small seeds such as sunflower seeds which do not have sufficient mass to be readily separated from the air and tend therefore to be transported to the fan. In addition such cyclone separators have a severe problem in that if a blockage occurs in the duct the separated material builds up in the separator until the material is drawn through the outlet to the fan thus blocking the whole system and requiring a major overall to release the blockage.

SUMMARY OF THE INVENTION

It is one object of the invention therefore to provide a cyclone separator of an improved nature which overcomes the problems of separation of low mass particulate material and also the problem of blockages.

Accordingly the invention provides a cyclone separator for extracting particulate material from an air stream comprising an outer cylindrical container arranged with its axis vertical, an inner cylinder co-axial with and arranged inside the outer container to form an annular space therebetween, an inlet for the air and particulate material arranged to inject air substantially tangentially into the annular space, the inner cylinder having a peripheral wall extending to an open bottom at a position below the inlet and an opening in the peripheral wall communicating with said annular space, and an outlet connected at the top of the cylinder from which air is withdrawn from the container.

With the foregoing in view, and other advantages as will become apparent to those skilled in the art to which this invention relates to this specification proceeds, the invention is herein described by reference to the accompanying drawings forming a part hereof, which includes a description of the best mode known to the applicant and of the preferred typical embodiment of the principles of the present invention, in which:

DETAILED DESCRIPTION

Figure 1:
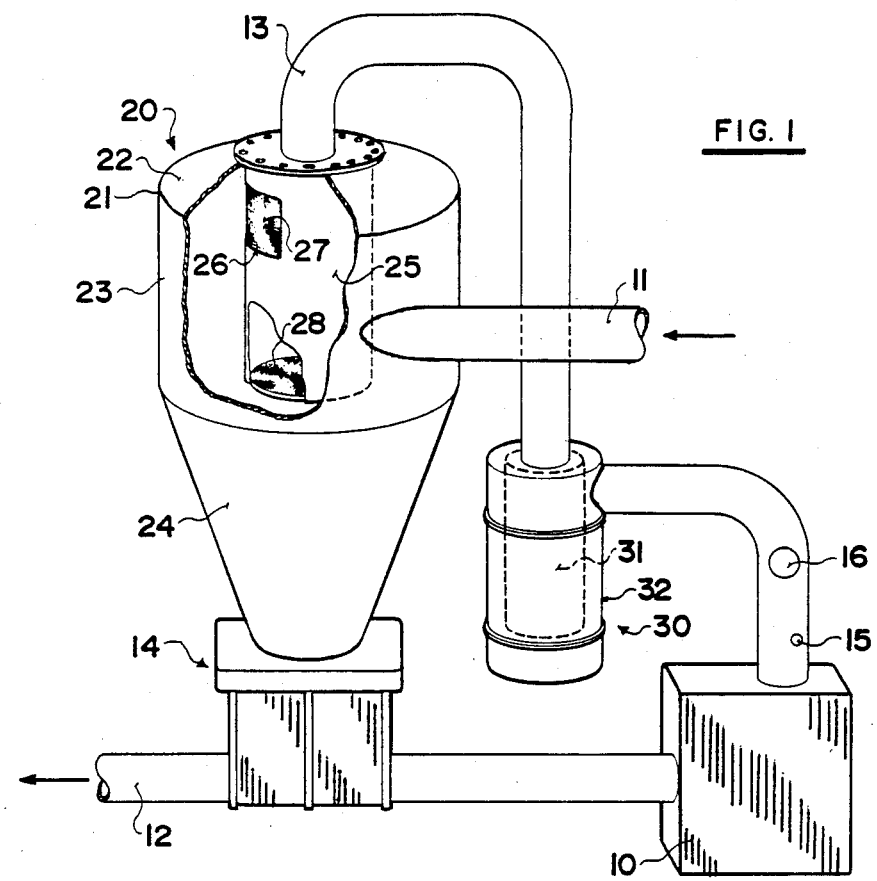
FIG. 1 is an isometric view showing a portion of a pneumatic grain transport apparatus including a cyclone separator according to the invention.

The pneumatic conveying apparatus comprises a fan 10, the housing of which only is shown schematically since it is of conventional arrangement and driven by conventional techniques such as the power take-off shaft from a tractor or an hydraulic supply from a tractor or alternatively a motor mounted upon the frame of the apparatus (not shown). The apparatus has an inlet duct 11 and an outlet duct 12. The inlet duct 11 can include a flexible pipe (not shown) for movement to various locations to collect particulate material. The outlet duct 12 similarly can include a flexible pipe for communicating conveyed particulate material to various locations depending on requirements. The details of the inlet and outlet ducts are not shown as these are conventional and well-known to one skilled in the art.

In order to separate the particulate material from the airstream in the duct 11 to prevent the particulate material reaching the fan 10, a cyclone separator generally indicated at 20 is coupled into the duct together with a filter generally indicated at 30. Specifically the separator 20 comprises an outer container 21 formed from an upper frusto-conical surface 22, a cylindrical portion 23 and a bottom frusto-conical portion 24. The axis of the container 21 is arranged vertically with an outlet duct 13 coupled at the top of the container 21 and a collector for the particulate material generally indicated at 14 at the bottom of the container 21.

Within the container 21 is mounted an inner cylinder 25 coaxial to the cylindrical portion 23 so as to form an annular space between the peripheral surface of the inner cylinder 25 and the cylindrical portion 23. The height of the inner cylinder 25 is substantially the same as the height of the cylindrical portion 23 and the frusto-conical portion 22, with the frusto-conical portion 22 being very shallow. The inlet duct 11 communicates with the cylindrical portion 23 of the container 21 at the mid-height of the cylindrical portion 23 at an angle which injects the air and particulate material stream in the duct 11 into the annular space substantially tangentially thereto.

The outlet duct 13 communicates with the container 21 centrally of the top so that it communicates with the interior of the inner cylinder 25. The bottom of the cylinder 25 is open and extended downwardly toward the bottom of the container 21 with the bottom of the cylinder 25 below the inlet of the duct 11. An opening 26 in the peripheral wall of the cylinder 25 is rectangular in shape and extends over an angle of the order of 90° around the periphery. The height of the opening is less than half of the height of the cylinder 25 and the whole of the opening lies in the upper half of the cylinder 25, that is above the inlet of the duct 11. As shown in the drawing, the angular extent of the opening 26 is less than 180° and is arranged relative to the inlet 11 such that immediately the inlet is positioned an imperforate portion of the wall 25.

Figure 2:
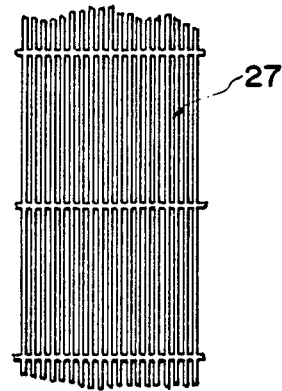
FIG. 2 is an enlarged view of a portion of the screen 27 of FIG. 1.
Figure 3:
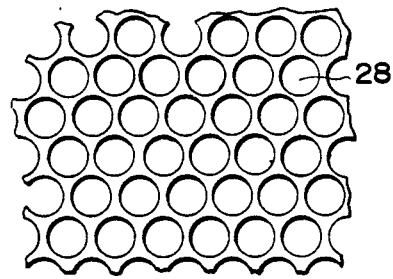
FIG. 3 is an enlarged view of a portion of the screen 28 of FIG. 1.

A filter screen covers the opening 26 and is generally indicated at 27. A further filter screen 28 covers the opening at the bottom of the cylinder 25. The screens are shown enlarged in FIGS. 2 and 3. The screen 28 is considerably coarser than the screen 27, that is, the perforations are of a substantially greater size. For example, the perforations in the screen 27 can be 0.008 inches (0.02 mm) by 0.55 inches (14.0 mm) and the perforations in the screen 28 can be circular of diameter 0.125 inches (3.2 mm).

The filters at 27 and 28 are fixed by means (not shown) which allows the filters to be readily removed for replacement by filters of a different grade for use with different particulate materials. In the extreme one or both of the filters can be omitted with particularly the filter 28 being omitted in many instances.

The duct 13 communicates with the filter 30 which comprises an inner filter screen 31 and an outer container 32. The duct 13 communicates directly with the interior of the screen 31 with the fan 10 acting to draw air from the container 32 outside of the filter 31. In this way air drawn by the fan 10 passes through the filter screen 31 and is drawn from the duct 13.

Figure 4:
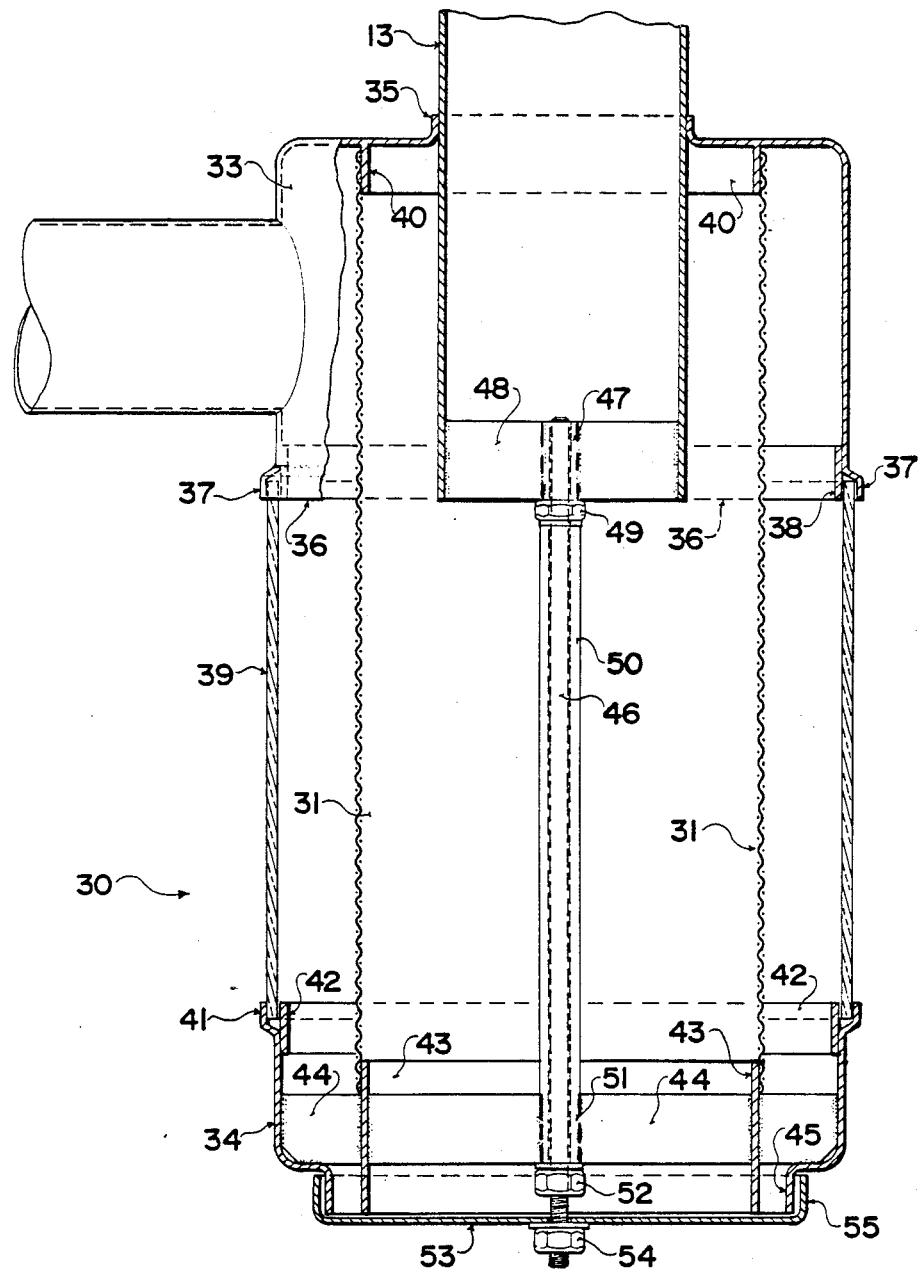
FIG. 4 is a cross-sectional view on an enlarged scale of the filter 30 of FIG. 1.

The container 32 of the filter 30 is shown in more detail in FIG. 4 and comprises upper and lower end caps 33, 34 respectively. The upper end cap 33 includes a turned down section 35 of the same diameter as the duct 13 so that it can be welded to the duct 13 with the duct 13 extending through the end cap and terminating in the same plane as the end face of the end cap indicated at 36. The outlet duct from the filter communicates radially with the end cap 33 at a position substantially centrally at the height of the end cap.

The end cap includes an outer lip 37 and cooperating ring 38 thus providing a channel for receiving a plexiglass cylinder 39 forming the main body of the wall of the container 32.

In addition the end cap 33 includes a ring 40 welded to the upper of the face of the end cap for providing an inner axial support for the upper end of the filter screen 31.

The lower end cap 34 includes an outer lip and cooperating ring 41, 42 respectively of corresponding shape to the lip 37 and ring 38 so as to receive the lower end of the plexi-glass cover 39. In this way the plexi-glass cover 39 is clamped between the end caps and held in position. In addition the end cap 34 carries a cylindrical support 43 corresponding to the ring 40 for supporting the lower end of the filter screen 31. The cylinder 43 is supported relative to the end cap 34 on a diametrical plate 44 extending across the end cap 34. The plate 44 also provides axial support for the filter screen 31 so that the filter screen also is clamped between the inface of the upper end cap 33 and the upper edge of the plate 44. The plate 44 is welded into position in the end cap 34 but it is also supported on shoulders provided by a turned down section of the end cap which provides a cylindrical flunge on the bottom of the end cap of reduced diameter relative to the main body of the end cap 34. The cylinder 43 extends downwardly to a position terminating in the same plane as the lower most face of the flunge indicated at 45.

The end caps 33 and 34 are located axially by a rod 46. The rod 46 is screwed into a sleeve 47 at its upper end, the sleeve 47 being supported within the end of the duct 13 by a transverse diametrical plate 48. A nut 49 acts to lock the rod 46 in position in the sleeve 47 and provide a shoulder for a sleeve 50 which extends along the height of the rod to a further sleeve 51 welded to the plate 44. A nut 52 screw-threaded onto the rod 46 acts to hold the sleeve 51 relative to the sleeve 50 and the nut 49 so that the end cap 34 is held axially relative to the duct 13 and hence the end cap 33.

An extension portion of the rod 46 passes through a bottom cover 53 which is held in place on the rod 46 by a nut 53. The cover 53 includes an upwardly extending flunge 55 which cooperates with the flunge 45 of the end cap 34 to provide a seal over the end of the end cap 34 which also cooperates with the cylinder 43 to prevent the escape of material collected within the filter screen into the annulose around the filter screen.

The collector 14 includes an air lock (not shown) which is of conventional structure and hence well known to one skilled in the art but prevents air passing in the duct 12 from the fan 10 re-entering the container 21 from the bottom while allowing the particulate material to enter the duct 12 after collection at the bottom of the container 21.

In operation the fan acts to draw air into the annular space between the cylinder 25 and the cylindrical portion 23 through the duct 11 which carries with it the particulate material. The air and particulate material swirls around within the annular space with the particulate material dropping from the air stream under gravity and collecting at the bottom of the container 21. The air freed from the particulate material escapes through the opening 26 and the bottom of the cylinder 25 with the majority of the air passing through the bottom of the cylinder 25. The presence of the opening 26 assists in the separation of lighter particles from the air but includes a filter which is sufficiently fine to prevent the lighter particles from passing through into the duct 13. Thus the separator acts to separate even the most difficult materials such as sunflower seeds for collection at the bottom of the container 21. The clean air further filtered by the filter screen 31 passes to the fan 10 and is blown out along the duct 12. The particulate material is then deposited in the duct 12 by the air lock device (not shown) for transport to a remote location.

In the event that the duct 12 becomes blocked with the particulate material thus preventing any further material from entering the duct from the bottom of the container 21, the cyclone separator continues to separate the particulate material from the incoming airstrem and hence fills gradually with the particulate material. As the material reaches the bottom of the inner cylinder 25, the proportion of the airstream passing through the opening 26 and through the bottom change so that the majority of the air passes through the opening 26. This prevents the particulate material from being drawn into the cylinder 25 and hence into the duct 13. This is achieved without the necessity of providing a fine filter screen on the bottom of the separator since such a screen would readily become blocked with the material and also inhibits the passage of air thus reducing the capacity of the machine. However the opening 26 can include a fine screen without seriously interfering with the normal operation of the device and hence prevent the particulate material entering the duct 13 even if the material reaches the height of the opening 26. When the cyclone separator is sufficiently blocked with the material to reduce the passage of air to the fan as detected by a pressure sensor on the inlet to the fan schematically indicated at 15, a valve schematically indicated at 16 is opened to allow inlet air from the atmosphere to avoid overloading the fan.

In normal usage the filter screen 31 will gradually collect material filtered from the airstream and occasionaly the filter will become filled with material when a blockage occurs in the cyclone. When this occurs the filter screen can be readily cleaned merely by removing the end cap 53 controlled by the nut 54 thus exposing the interior of the filter screen 31 to ready manual cleaning. Thus it is not necessary to dismantle the whole of the container 32 to provide a rapid and simple cleaning of the filter but of course this can be readily achieved by simply removing the nut 52 whereby the end cap 34 and plexi-glass cover 39 can be readily removed by moving downwardly relative to the lip 37 of the upper end cap 33.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A cyclone separator for extracting particulate material for an air stream comprising an outer cylindrical container arranged with its axis vertical and having a closed top wall, and inner cylinder co-axial with and arranged inside the outer container to form an annular space therebetween, said inner cylinder depending from said closed top wall, an outlet connected through the closed top wall for withdrawing air from the container and communicating with the interior of said inner cylinder and an inlet for the air and particulate material arranged to inject air substantially tangentially into the annular space, said inner cylinder having an imperforate peripheral wall extending from said closed top wall to an open bottom at a position below the inlet and an opening in the peripheral wall communicating with said annular space, said opening being sufficiently large to receive the majority of the air from said inlet and being confined in said peripheral wall to an area above said inlet having an angular extent less than 180° and angularly spaced from the inlet such that a portion of the peripheral wall immediately adjacent the inlet is imperforate.

2. A separator according to claim 1 including a perforated filter sheet extending over the open bottom.

3. A separator according to claim 1 including a perforated filter sheet extending over the opening in the peripheral wall.

4. A separator according to claim 1 including a first perforated filter sheet extending over the open bottom and a second perforated filter sheet extending over the opening in the peripheral wall, wherein the first filter sheet is coarser than the second filter sheet.

5. A separator according to claim 4 wherein the second filter sheet has perforations which are sufficiently fine to prevent passage of the particulate material.

6. A separator according to claim 1 including a filter downstream of said outlet.

7. A separator according to claim 9 wherein the opening extends over the order of 90 degrees.

8. A separator according to claim 1 wherein the inlet lies in a plane passing substantially through the mid-height of the inner cylinder.

9. A separator according to claim 1 including a fan, means connecting the fan to the outlet whereby to develop the airstream passing into the container through the inlet and exiting therefrom through the outlet, means connecting a downstream side of the fan to a duct for transporting the particulate material and means connected to the bottom of the container for communicating particulate material separated from the airstream and collected at the bottom of the container into the duct.

10. A separator according to claim 9 including a bypass valve responsive to an increase in pressure adjacent to the fan caused by a blockage in the duct to communicate the upstream side of the fan to atmosphere.

11. A separator according to claim 9 including a filter positioned intermediate the fan and the outlet to extract solid material from the airstream.

12. A separator according to claim 11 including a conduit leading from the outlet to the filter, means mounting a cylindrical filter screen around an end of the conduit, container means surrounding the filter screen and defining therebetween an annular space, conduit means for connecting the annular space to the fan and a removable end cap means closing one end of the filter screen.

* * * * *